May 3, 1960     E. F. MEKELBURG     2,935,578
DEVICE WITH PHASE SHIFTABLE VOLTAGE PICK-OFF POINT
Filed March 29, 1954     2 Sheets-Sheet 1

INVENTOR.
Earl F. Mekelburg.
BY Myron J. Seibold
ATTORNEY.

May 3, 1960 E. F. MEKELBURG 2,935,578
DEVICE WITH PHASE SHIFTABLE VOLTAGE PICK-OFF POINT
Filed March 29, 1954 2 Sheets-Sheet 2
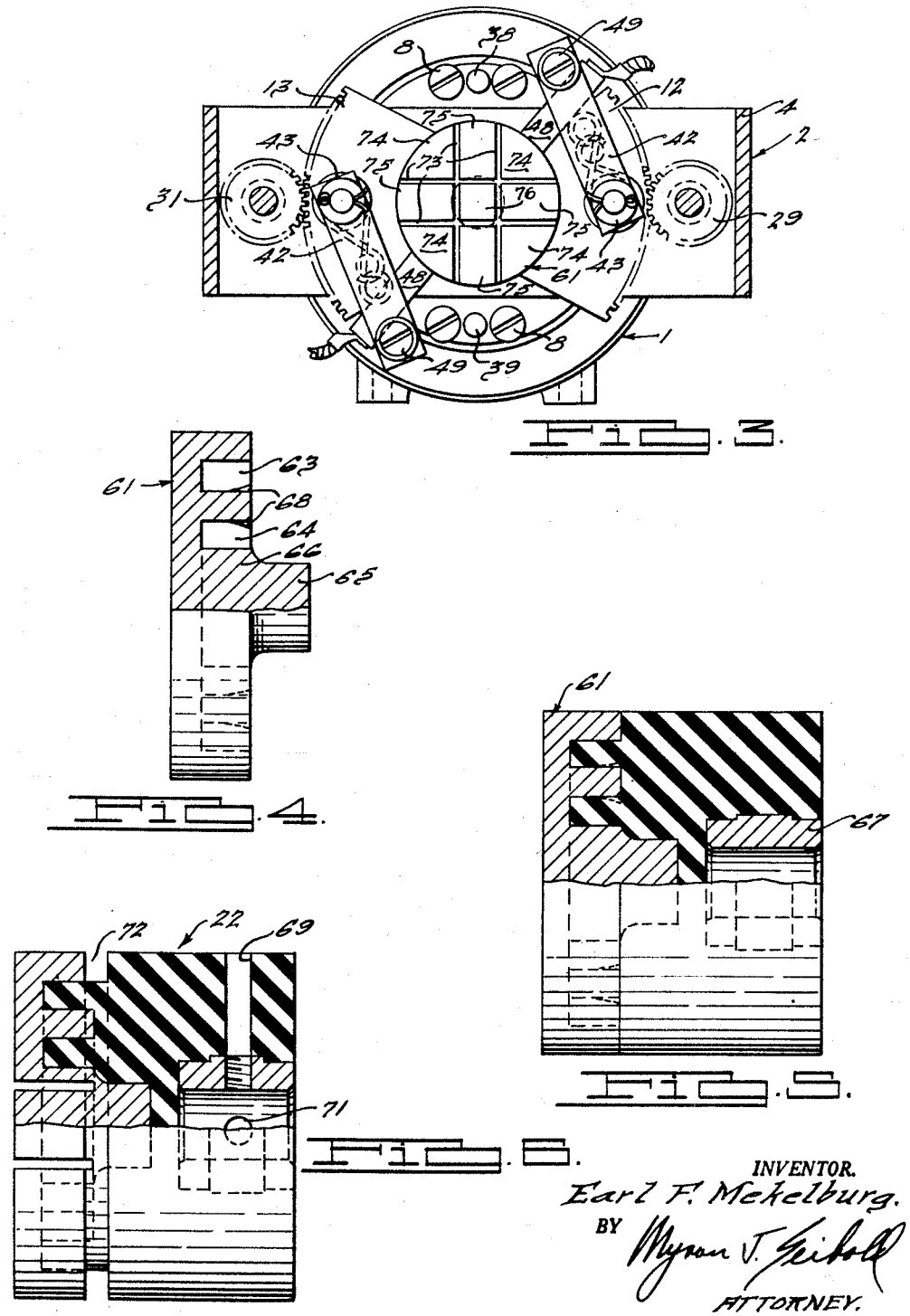
INVENTOR.
Earl F. Mekelburg.
BY
ATTORNEY.

United States Patent Office 2,935,578
Patented May 3, 1960

2,935,578
DEVICE WITH PHASE SHIFTABLE VOLTAGE PICK-OFF POINT

Earl F. Mekelburg, Wauwatosa, Wis., assignor to Square D Company, Detroit, Mich., a corporation of Michigan Application March 29, 1954, Serial No. 419,212

5 Claims. (Cl. 200—25)

This invention relates to control means and more specifically to a phase-shiftable voltage pick-off point controlling means for controlling current flow through a load.

In present day control mechanisms, it is many times advantageous to control the operation and/or heating in a load device by varying not only the amount of continuous current flowing through the load device, but by varying the time in each half cycle of alternating current that current flows through the load device. Furthermore, in some types of load devices, the most efficient method of controlling current flow is to control the duration of current flow during any half cycle of excitation of an electronic tube, as, by way of example only and in no way limiting the use thereto, in a welding device where welding takes place in only a few cycles or half cycles of applied voltage and wherein the duration of current flow in each cycle or half cycle may determine the temperature generated during the weld. To accomplish this control, a variable pick-off point control voltage is employed which may actuate a means for initiating current flow at a preselected time during the cycle of applied voltage while preventing current flow through the load device prior to the selected time. It is one object of the present invention to provide a device whereby the phase relationship between an applied voltage and control voltage pick-off point may be varied.

A further object of the present invention is the provision of a simple and improved synchronously driven device for controlling the phase relationship between applied voltage and the pick-off point of a control voltage for a load device.

Another object of the present invention is the provision of an improved form of phase shift control device employing a synchronously driven commutator and adjustable pick-off brushes.

A further object of the present invention is the provision of a synchronous pick-off device adapted to provide a plurality of control voltages whose pick-off points may be phase shifted relative to an applied voltage for the control of currents individually fed to a plurality of load devices.

A further object of the present invention is a commutator of novel construction.

Another object of the present invention in accordance with the preceding object is an improved and simple method of constructing a commutator.

Further objects and features of the invention will be readily apparent to those skilled in the art from the specification and drawings illustrating a certain preferred embodiment in which:

Figure 3 is a sectional view taken along the lines III—III of Figure 2.

Figure 4 is a partial sectional view of the commutator blank prior to molding into a commutator assembly.

Figure 5 is a partial sectional view of the commutator assembly after molding.

Figure 6 is a partial sectional view of the completed commutator.

Figures 1, 2:
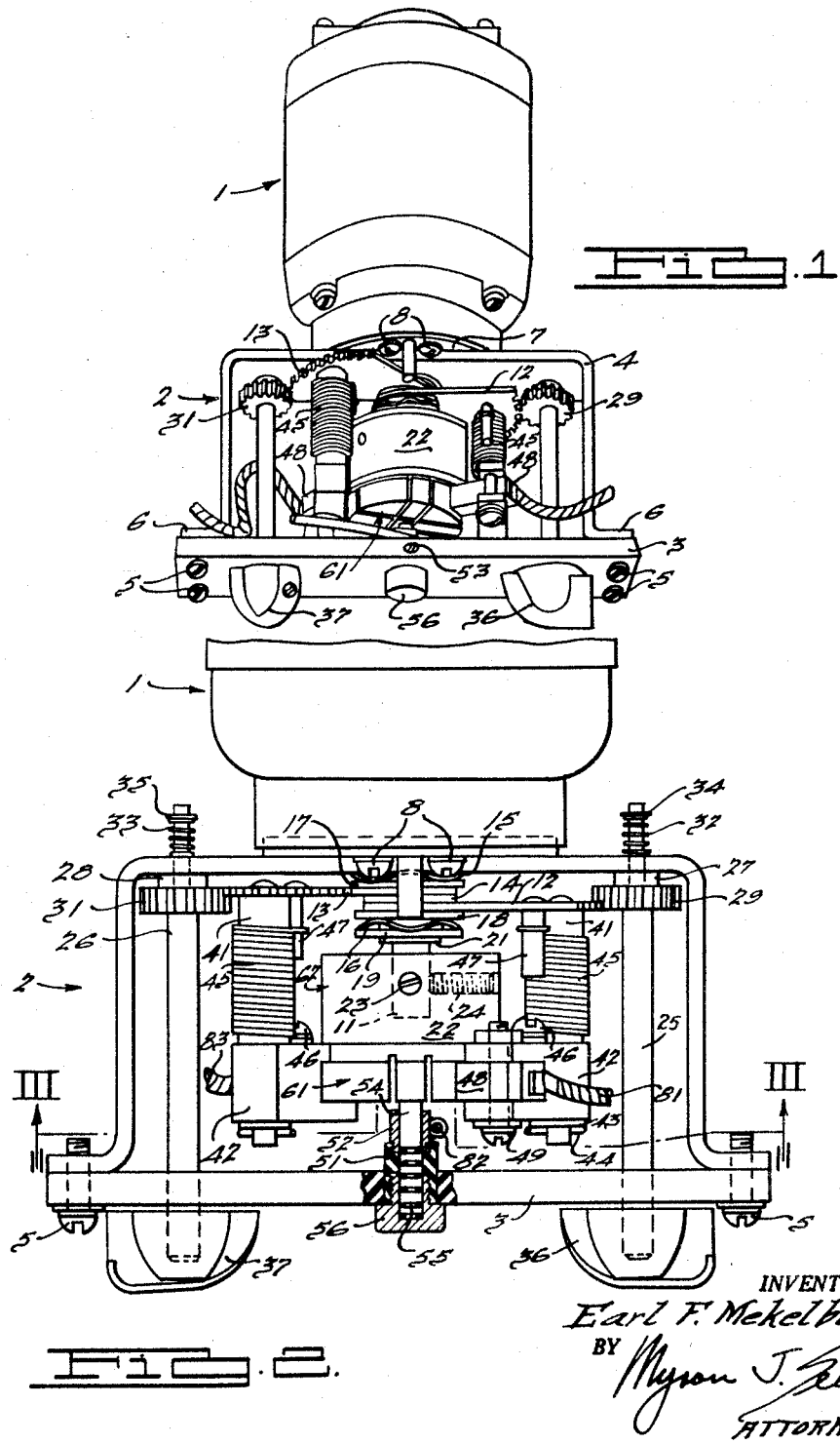
Figure 1 is a top perspective view of the motor driven control device of the present invention.
Figure 2 is a top plan view of the adjustable control device of the present invention.

The phase-shiftable pick-off point controlling device of the present invention includes a drive motor 1 which is a conventional synchronous alternating current motor of sufficient power rating to drive the rotating members of the device and a control section 2 containing the adjustable members for selecting the desired phase shift. The adjustable members of the control section of the invention are supported between a strip 3 of insulating material such as Bakelite and a generally U-shaped member 4. The insulating plate 3 is rigidly fixed to the U-shaped member 4 by studs 5 passing through the strip and threading into outwardly turned flanges 6 of the member 4. The member 4 is secured by suitable means, as for instance welding, to a circular disk 7 fixed to the end plate of the drive motor 1 by studs 8 at either side of the member 4. The member 4 is provided with a central opening in the bight portion thereof through which passes the drive shaft 11 of the motor 1.

Portions of the control section of the present invention are either fixed to the motor shaft 11 or rotatably supported thereon in a manner now to be explained. Between the member 4 and the insulating plate 3 a pair of geared sectors 12 and 13 are rotatably supported on the shaft 11 of the motor. The sectors 12 and 13 are separated by a spacing washer 14 and are maintained in axial position by a pair of resilient spring washers 15 and 16 which cooperate respectively with washers 17 and 18 adjacent the sectors and, in the case of spring washer 15, the internal surface of the member 4 and, in the case of the spring washer 16, a stop washer 19 held by a ring fastener 21. At the end of the motor shaft 11 a commutator assembly 22 is fixed to the shaft by a pair of radial set screws 23 and 24. The commutator and its method of construction will be more fully described hereinafter.

Adjustable mechanisms are provided for moving the sectors 12 and 13 about their rotatable support on the motor shaft 11 constituting a pair of shouldered shafts 25 and 26 passing through the insulating plate 3 and through suitable holes in the bight portion of the member 4 near the outside edges thereof. Fixed to the shafts 25 and 26, as by being keyed thereto, and spaced from the internal portion of the bight of the member 4 by a pair of spacing washers 27 and 28 are a pair of pinions 29 and 31 in engagement with the sectors 12 and 13. The shafts 25 and 26 are biased axially within the bight of the member 4 by suitable springs 32 and 33 cooperating with conventional snap washers 34 and 35. This provides for normal interengagement of the pinions 29, 31 and sectors 12, 13 while permitting disengagement as desired by pulling the shafts 25, 26 forwardly against their bias. Externally of the insulating plate 3 a pair of adjustment knobs 36 and 37 are fixed to the shafts 25 and 26 by conventional means so as to facilitate rotatable adjusting sectors 12 and 13. A suitable scale, not shown, may be scribed on the insulating plate 3 to give an indication of the adjusted position of the associated sectors. A pair of pins 38 and 39 are provided on the circular plate 7 in the rotation path of the sectors 12 and 13 and operate as stops for the sectors in their adjusted movement about the motor shaft 11.

Electrical pick-off means are provided in the control device of the present invention as now will be described. The electrical pick-off of the present invention constitutes a pair of radial brushes and a central brush; the support arrangement for each of the radial brushes being identical, the same reference numerals are used. Fixed to the sectors 12, 13 approximately centrally thereof are brush support shafts 41 as by having one end thereof peened over about the sector. The free ends of the shafts 41 are provided with a reduced diameter upon which are rotatably supported brush holders 42 of insulating material, such as Bakelite, held in place on the shafts 41 by washers 43 and a cotter pin 44 passing through the shaft. The brush holders 42 are biased about their rotatable support on the shafts 41 by helical coil springs 45 secured at one end by screws 46 to the holder 42 and at their other ends on posts 47 fixed to the sectors. The brush holders 42 are in the form of C-shaped clamps providing a central slot into which brushes 48 may be inserted, being clamped in position by bolts 49 passing through the free ends of the legs of the clamps.

The central pick-off brush of the device of the present invention is supported on the insulating plate 3 in a brush holder 51 of insulating material and having a sleeve 52 of conducting material mounted on the interior end thereof. The brush holder 51 is held in place by a radial set screw 53 passing through the side of the insulating strip 3. The brush 54 is of conventional type and is spring loaded by spring 55 within holder 51 and maintained by a threaded knob 56.

The commutator portion 22 of the present invention constitutes a single piece conducting portion and an insulating portion so constructed as to provide a plurality of interconnected, spaced portions as will now be explained. The description of the operation of the novel commutator will best be served by a description of the method of construction of the commutator from which the operation of the commutator should be readily apparent.

The commutator of the present invention constitutes a disc 61 formed from a single piece of copper molded together with a central metallic bushing 67 in an insulating material such as Bakelite. The internal surface of the disc 61 is provided with a pair of annular grooves 63 and 64 and a central hub 65 having an arcuate filet 66 out to the inner portion of the annular groove 64. The disc 61 is embossed along portions of its internal section as defined by grooves 63 and 64 to produce nibs 68 at various points throughout the internal section of the commutator to insure solid connection of the conducting portion with the insulating material during molding. After the conducting disc 61 and the bushing 67 have been molded into the composite commutator 22, radial holes 69 and 71 are drilled and the bushing is tapped to receive set screws 23 and 24 which hold the commutator 22 to the shaft 11 of the drive motor 1. In the next step of construction, the outside diameter of the commutator is turned, the face finished, and an undercut groove 72 cut into the commutator 22 at the edge of the conducting portion 61. The next step in the construction of the commutator is to mill the flat face of conducting disc 61 to provide the double slot cross construction as its best shown in Figures 1 and 3. The depth of the milled slots in the face of disc 61 is best shown in Figure 6 where it may be seen that the slots do not completely isolate the metal therebetween from the hub 65 because of the rounded filet portion 66. Referring now to Figure 3, it may be seen that the slots 73 are so cut in the face of the conducting portion 61 as to isolate the four sectors 74 from the remaining portions of the conducting area and to provide four portions 75 interconnected with a central portion 76 by the rounded filet 66 of the central hub 65, giving four electrically common segments in the circumference of the disc 61. The connection of segments 75 with the central segment 76 of the hub and the isolation of segments 74 from segment 76 is shown in Fig. 3 wherein the dotted circle represents the fillet 66. It is clearly seen in this figure that the slots 73 separate the segments 74 and 76. It may now be seen that with the composite commutator 22 mounted on the shaft 11 of the drive motor 1 and rotating therewith, electrical interconnection will be established between the central brush 54 on the face of the disc 61 and the radial brushes 48 in succession throughout each revolution of the drive shaft 11 of the motor 1. It may also be seen now that the point of engagement of the radial brushes 48 with the conducting segments of the circumferential surface of disc 61 may be angularly adjusted about the rotatable support of the sectors 12 or 13 on the shaft 11 of the drive motor 1 by rotation of the adjustment knobs 36 or 37 to provide adjustment of the phase relationship between an applied voltage and the pick-off point or time of electrical connection of either brush 48 to a control circuit.

With the pick-off point phase shift controlling means of the present invention, it is possible to pick off a control voltage phase-shifted from an applied voltage which may be used, as, for example, in the case of a welding device, to initiate the current flow through the welding contacts at some preselected time during the voltage cycle. To accomplish this objective, electrical conductors 81, 82 and 83 may be connected to brushes 48, 48 and 54, respectively, through which selectable control voltages with pick-off points variable in phase from an applied voltage may be supplied to a load device from conductors 81 and 83. The present device, when associated with the necessary selection controls, may then supply two independently adjusted control voltages phase-shifted in pick-off from an applied voltage to provide two different conditions of control.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a control device for initiating a selected control voltage from an alternating current reference voltage, the combination comprising; an electric motor energized for rotation at a synchronous speed by the alternating current source, a commutator rotatably driven by the motor, said commutator including metallic portions alternately spaced and electrically separated and metallic portions electrically interconnected and spaced between the electrically separated portions, means for continuously impressing the alternating current reference voltage on all of the electrically interconnected portions, means including a pair of brushes each arranged for all of said portions and at least one of the interconnected portions during each half cycle of the alternating current and means for adjustably positioning the brush means relative to the electrically interconnected portions and the electrically separated portions for individually varying the interval of engagement of said brush means with the electrically interconnected portions during each half cycle.

2. In a device of the character described, the combination comprising; a synchronous motor having a shaft rotatable at a synchronous speed whenever the motor is energized from an alternating current source of reference voltage, a commutator rotatably driven by the shaft having; metallic portions alternately spaced and electrically separated and metallic portions electrically interconnected and spaced between the electrically separated portions, means for constantly impressing the voltage of the source on all of the electrically interconnected portions, a pair of brushes arranged for engaging all of the portions of the commutator, and means resiliently carried by the shaft providing an adjustable mounting for the brushes and for moving the brushes individually relative to the commutator.

3. In a device of the character described, the combination comprising; a synchronous motor having a shaft rotatable at a synchronous speed whenever the motor is energized from an alternating current reference voltage source, a commutator rotatably driven by the shaft having; metallic portions alternately spaced and electrically separated and metallic portions electrically interconnected and spaced between the electrically separated portions, means for constantly impressing the voltage of the source on all of the interconnected portions, a pair of brushes in constant contact with the commutator and each arranged to alternately engage the electrically separated and electrically interconnected portions as the commutator is rotated by the motor, means resiliently carried by the shaft and providing an adjustable support for each of the brushes, said means being arranged for adjustably positioning the brushes individually relative to the commutator, and means individual to each of the brushes for moving the brush supporting means to an adjusted position.

4. A control device for selectively initiating a control voltage from an alternating current reference voltage comprising; a synchronous motor having a rotatable shaft arranged to be rotated at a synchronous speed whenever the motor is energized from an alternating current reference voltage source, a commutator rotatably driven by the shaft constituting a disc of conducting material mounted on an insulating support, brush means in constant engagement with a central portion of the disc for impressing the voltage of the source on the disc, a plurality of slots in said disc arranged to divide the periphery of the disc into alternately disposed portions electrically separated from the central portion and a plurality of portions electrically connected with the central portion, a pair of brushes in engagement with the periphery of the disc arranged to engage both the electrically separated and the electrically connected portions, adjustable means resiliently positioned by the shaft and arranged to support the pair of brushes independent of the rotation of the shaft and individually relative to the commutator, and means for adjustably positioning the adjustable means for varying the individual engagement of the pair of brushes supported thereon with the portions of the commutators.

5. In a control device of the character described, the combination comprising; a motor having a shaft rotatable at a continuous synchronous speed whenever the motor is energized, a commutator rotatably driven by the shaft constituting a disc of conducting material mounted on an insulating support, brush means in constant engagement with a central portion of the disc for impressing the voltage of the source on the disc, a plurality of slots in said disc arranged to divide the periphery of the disc into alternately disposed portions electrically separated from the central portion and a plurality of portions electrically connected with the central portion, a pair of brushes in engagement with the periphery of the disc arranged to alternately engage the electrically separated and the electrically connected portions, and means pivotally and resiliently carried by the shaft providing an adjustable mounting for the brushes for moving the brushes individually relative to the commutator.

References Cited in the file of this patent

UNITED STATES PATENTS

| | | |
|---|---|---|
| 587,024 | Thomson | July 27, 1897 |
| 713,284 | Buck | Nov. 11, 1902 |
| 767,759 | Lunt | Aug. 16, 1904 |
| 1,197,262 | Butler | Sept. 5, 1916 |
| 1,306,923 | Myers | June 17, 1919 |
| 1,577,553 | Baker | Mar. 23, 1926 |
| 1,784,122 | Wantz | Dec. 9, 1930 |
| 1,786,391 | Grover et al. | Dec. 23, 1930 |
| 2,090,010 | Sabatino | Aug. 17, 1937 |
| 2,192,709 | Lee | Mar. 5, 1940 |
| 2,451,500 | LeGreid | Oct. 19, 1948 |
| 2,510,067 | Callander | June 6, 1950 |
| 2,674,784 | Roberts et al. | Apr. 13, 1954 |
| 2,686,286 | Owen | Aug. 10, 1954 |
| 2,724,025 | Sevin | Nov. 15, 1955 |

UNITED STATES PATENT OFFICE

CERTIFICATE OF CORRECTION

Patent No. 2,935,578       May 3, 1960

Earl F. Mekelburg

It is hereby certified that error appears in the printed specification of the above numbered patent requiring correction and that the said Letters Patent should read as corrected below.

Column 3, line 58, for "its" read -- is --; column 4, line 49, after "for" insert -- engaging --.

Signed and sealed this 4th day of April 1961.

(SEAL)
Attest: ERNEST W. SWIDER
Attesting Officer

ARTHUR W. CROCKER
Acting Commissioner of Patents